United States Patent
Choi et al.

(10) Patent No.: US 11,459,683 B2
(45) Date of Patent: Oct. 4, 2022

(54) CONTROL METHOD OF LAUNDRY APPARATUS

(71) Applicant: LG ELECTRONICS INC., Seoul (KR)

(72) Inventors: Moonsuk Choi, Seoul (KR); Hoonbong Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 21 days.

(21) Appl. No.: 16/643,038

(22) PCT Filed: Aug. 16, 2018

(86) PCT No.: PCT/KR2018/009410
§ 371 (c)(1),
(2) Date: Feb. 28, 2020

(87) PCT Pub. No.: WO2019/045333
PCT Pub. Date: Mar. 7, 2019

(65) Prior Publication Data
US 2020/0208322 A1    Jul. 2, 2020

(30) Foreign Application Priority Data

Aug. 29, 2017 (KR) ........................ 10-2017-0109239

(51) Int. Cl.
| | |
|---|---|
| *D06F 33/32* | (2020.01) |
| *D06F 34/08* | (2020.01) |
| *D06F 34/16* | (2020.01) |
| *D06F 103/26* | (2020.01) |
| *D06F 103/18* | (2020.01) |
| *D06F 103/04* | (2020.01) |

(Continued)

(52) U.S. Cl.
CPC .............. *D06F 33/32* (2020.02); *D06F 34/08* (2020.02); *D06F 34/16* (2020.02);
(Continued)

(58) Field of Classification Search
CPC ....... D06F 34/18; D06F 33/32; D06F 2103/04
See application file for complete search history.

(56) References Cited

U.S. PATENT DOCUMENTS

| | | |
|---|---|---|
| 2006/0021392 A1 | 2/2006 | Hosoito et al. |
| 2017/0096768 A1 | 4/2017 | Kim et al. |
| 2018/0266034 A1* | 9/2018 | Kamiyama ............. D06F 37/42 |

FOREIGN PATENT DOCUMENTS

| | | |
|---|---|---|
| JP | 2004-113286 | 4/2004 |
| JP | 2017-064428 | 4/2017 |

(Continued)

OTHER PUBLICATIONS

KR20150055466A Claims Machine Translation (Year: 2015).*
(Continued)

*Primary Examiner* — Spencer E. Bell
(74) *Attorney, Agent, or Firm* — KED & Associates LLP

(57) ABSTRACT

Disclosed is a control method of a laundry apparatus comprising: a drum provided to hold clothes; and a drive unit configured to rotate the drum, the control method comprising: an accelerating step for accelerating the drum; a decelerating step for decelerating the drum; and a laundry load sensing step for sensing the laundry load of the clothes held in the drum based on a measured acceleration value of the drive unit during the accelerating step and a measured deceleration value of the drive unit during the decelerating step.

15 Claims, 6 Drawing Sheets

(51) Int. Cl.
*D06F 103/46* (2020.01)
*D06F 103/02* (2020.01)
*D06F 103/24* (2020.01)
*D06F 105/48* (2020.01)

(52) U.S. Cl.
CPC ...... *D06F 2103/02* (2020.02); *D06F 2103/04* (2020.02); *D06F 2103/18* (2020.02); *D06F 2103/24* (2020.02); *D06F 2103/26* (2020.02); *D06F 2103/46* (2020.02); *D06F 2105/48* (2020.02)

(56) References Cited

FOREIGN PATENT DOCUMENTS

| KR | 10-2011-0023061 | 3/2011 |
| KR | 10-2014-0045714 | 4/2014 |
| KR | 10-2015-0019647 | 2/2015 |
| KR | 10-2015-0055466 | 5/2015 |

OTHER PUBLICATIONS

Human Translation of KR20150055466A (Year: 2015).*
International Search Report dated Jan. 9, 2019 issued in Application No. PCT/KR2018/009410.
Written Opinion dated Jan. 9, 2019 issued in Application No. PCT/KR2018/009410.
Korean Office Action dated Sep. 14, 2021 issued in Application No. 10-2017-0109239.

* cited by examiner (a)

(b)

CONTROL METHOD OF LAUNDRY APPARATUS

CROSS-REFERENCE TO RELATED PATENT APPLICATIONS

This application is a U.S. National Stage Application under 35 U.S.C. § 371 of PCT Application No. PCT/KR2018/009410, filed Aug. 16, 2018, which claims priority to Korean Patent Application No. 10-2017-0109239, filed Aug. 29, 2017, whose entire disclosures are hereby incorporated by reference.

TECHNICAL FIELD

Embodiments of the present disclosure relate to a control method of a laundry apparatus, more particularly, to a laundry load sensing method for sensing the load of the laundry loaded in a drum, using a current value of a drive unit measured in a process of decelerating after accelerating the drive unit or drum.

BACKGROUND ART

Generally, a laundry apparatus includes a washer configured to perform washing, a dryer configured to perform drying and a laundry machine with washing and drying functions configured to perform both washing and drying. Such a laundry apparatus may perform only washing or drying or both the washing and the drying. The washing means the concept including a wash cycle configured to wash off foreign substances or dirt from clothes or laundry (hereinafter, laundry) by applying a force to the clothes; a rinse cycle configured to separate foreign substances from the clothes; and a dry-spin cycle configured to remove moisture from the clothes.

The laundry apparatus may sense the load of the laundry loaded in the drum when performing the washing or the drying and determine the amount of the loads applied to the laundry, which includes a conversion degree of the rotation speed and direction of the drum applied to the clothes, the amount of the supplied water, and the amount of the supplied hot air. More specifically, when too much load is applied to a small load of laundry, energy waste might occur. When a small load is applied to a large load of laundry, a desired object of the washing or drying fails to be achieved. If too much load is applied, internal components of the laundry apparatus might be damage, and it is necessary to sense the load of the laundry loaded in the laundry apparatus.

A conventional laundry apparatus includes a load sensor provided to measure the load of the laundry directly. However, in case the load sensor is further provided, the total number of the components provided in the laundry apparatus might increase disadvantageously and the load sensor is likely to interfere with a drive unit configured to rotate the drum.

To solve those disadvantages, Korean Patent Application No. 10-2012-0111789 discloses an invention configured to calculate the current, voltage and counter electro-motive force which are applied to the drive unit by controlling the drive unit to temporarily rotate the drum holding clothes and indirectly measure the load of the clothes.

FIG. 1 illustrates a method for measuring the load of the clothing loaded in a conventional laundry apparatus. Referring to FIG. 1, section (a), the conventional laundry apparatus may perform an aligning step for aligning a motor in a basic position; an accelerating step for accelerating the drum to a first speed; a maintaining step for maintaining the rotation of the drum at a second speed as a constant velocity; and a stopping step for stopping the rotation of the drum.

In the process, the load of the laundry loaded in the drum is sensed based on the current flowing to the drive unit for rotating the drum during the accelerating section and the current flowing to the drive unit during the constant velocity section. More specifically, to sense the load of the laundry through the above-noted process, the conventional laundry apparatus uses a following formula:

$$Ldata = emf\_com \cdot (i^*_q\_ATb - i^*_q\_ATc)$$

'Ldata' refers to a value of the sensed laundry load, and 'emf_com' refers to a value of the compensated counter electro-motive force. '$iq^*\_ATb$' refers to a value of the current order averagely added in the acceleration section, and '$iq^*\_ATc$' refers to a value of the current order averagely added in the constant velocity section. It is to sense the precise load of the laundry by eliminating the current value applied by the friction of the drive unit that the average current order value in the constant velocity section is subtracted from the current order value in the acceleration section.

In this instance, the current order value means the current value supplied to rotate the drive unit at a desired speed, not the current value output from the drive unit.

$$emf\_com = C3 \cdot (emf\_ATc + C4 \times \Delta V)$$

Meanwhile, to calculate the compensation value of the counter electro-motive force, the conventional laundry apparatus needs to measure the average value (emf_ATc) of the counter electro-motive force and an error (V) of the voltage additionally.

$$emf = v^*_q\_Tc - Rs \cdot (i^*_q\_Tc)$$

To calculate the average of the counter electro-motive force (emf), the counter electro-motive force can be calculated after a voltage order value (Vq*) in the constant velocity section, a motor constant (RS) and a current order value (iq*_Tc) of the constant velocity section. In other words, it is necessary in the conventional laundry apparatus to measure the counter electro-motive force generated while maintaining the constant velocity, because it uses the constant velocity section as well as the accelerating section. To measure the counter electro-motive force, the voltage order value and the current order value have to be measured.

The conventional laundry apparatus has to measure both the voltage order value and the current order value primarily and calculate a voltage error from the measured voltage and current values secondarily. After that, the compensated value of the counter electro-motive force has to be calculated, and the current value lost by the friction force of the drive unit mentioned above has to be calculated lastly.

As a result, the conventional laundry apparatus has to measure all of the voltage and current values to calculate the load of the laundry and a disadvantage that the three compensations or tunings including the voltage error, the counter electro-motive compensation and the friction force compensation have to be put into consideration in the calculation formula so as to sense the load of the laundry. The precise load of the laundry might fail to be sensed according to the error occurrence frequency and the error consideration method. In addition, as the laundry load is repeatedly measured in case the precise load fails to be sensed in the process of compensating the error three times, the load of the laundry might be changed only not to rely on the sensed load of the laundry.

Moreover, it takes quite a time to drive the motor at a constant velocity and maintain the constant velocity for a preset time period such that it may take much time to sense the load of the laundry. Also, the conventional laundry apparatus uses diverse methods in sensing the load of the laundry according to a humid state and a water level.

Referring to FIG. 1, section (b), the conventional laundry apparatus measures the load of the laundry by raising a drum speed even to a third speed and maintaining at a fourth speed as the constant velocity and then calculates an average between the laundry loads measured at the first and second speeds so as to compensate the error finally. Accordingly, the conventional laundry apparatus has a disadvantage that the laundry load has to be measured several times.

MODE FOR INVENTION

Referring to the accompanying drawings, exemplary embodiments of the present disclosure according to one embodiment of the present disclosure will be described in detail. Regardless of numeral references, the same or equivalent components may be provided with the same reference numbers and description thereof will not be repeated. For the sake of brief description with reference to the drawings, the sizes and profiles of the elements illustrated in the accompanying drawings may be exaggerated or reduced and it should be understood that the embodiments presented herein are not limited by the accompanying drawings.

Figure 2:
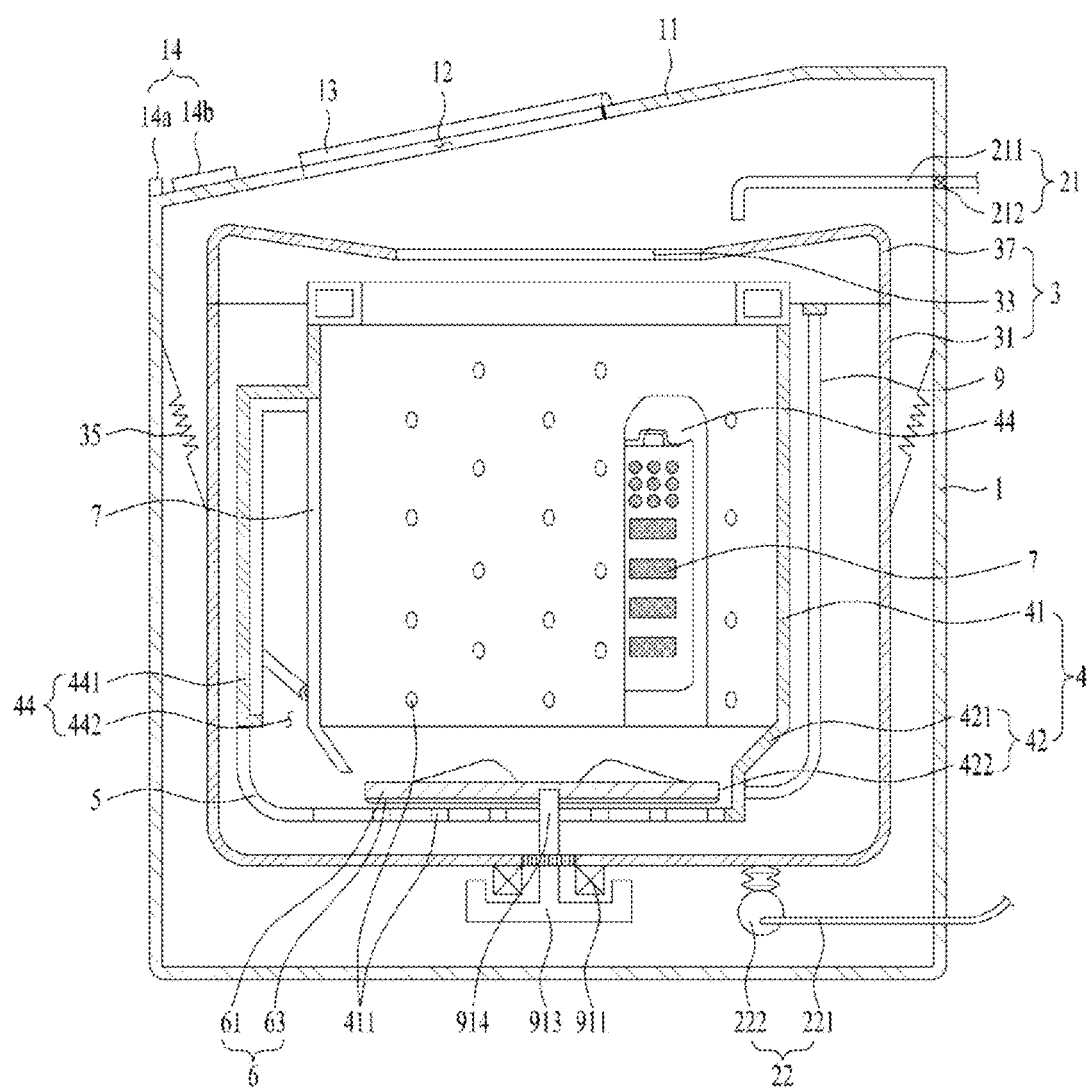
FIG. 2 is a diagram illustrating a structure of a laundry apparatus in accordance with the present disclosure.

FIG. 2 is a diagram illustrating a structure of a laundry apparatus in accordance with the present disclosure. The laundry apparatus in accordance with one embodiment may include a cabinet 1 which defines an exterior thereof; a tub 3 provided in the cabinet and configured to hold water; and a drum 4 provided in the tub and configured to hold clothes (hereinafter, laundry).

An opening 12 is formed in the cabinet 1 to load or unload the laundry into or from the drum and a door 13 is coupled to the cabinet 1 to open and close the opening 12. The laundry apparatus 100 in accordance with this embodiment may be a top load type configured of the opening 12 formed in an upper panel 11 provided in a top of the cabinet 1. However, it is not excluded that the laundry apparatus is a front load type configured of the opening 12 formed in a front surface of the cabinet 1.

Figure 1:
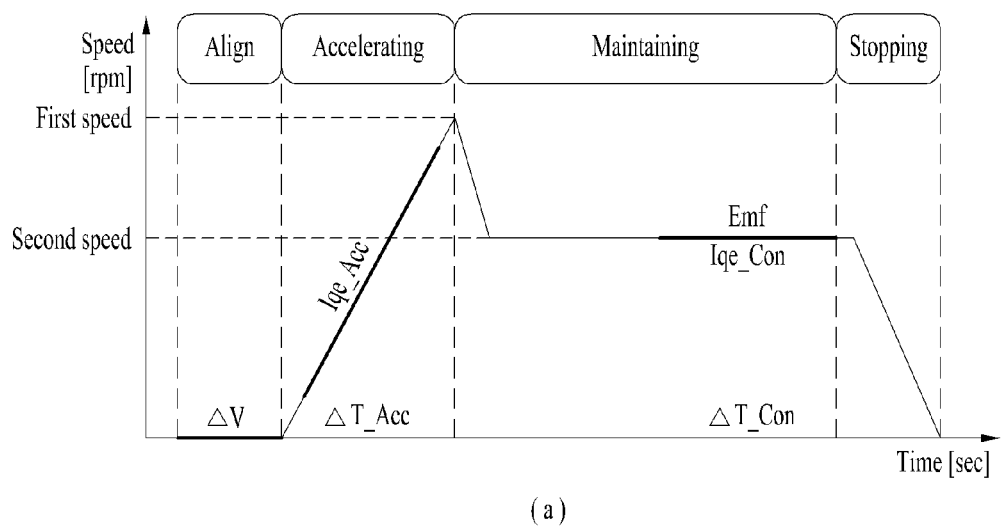
FIG. 1 is a diagram illustrating a control method of a conventional laundry apparatus.
Figure 1:
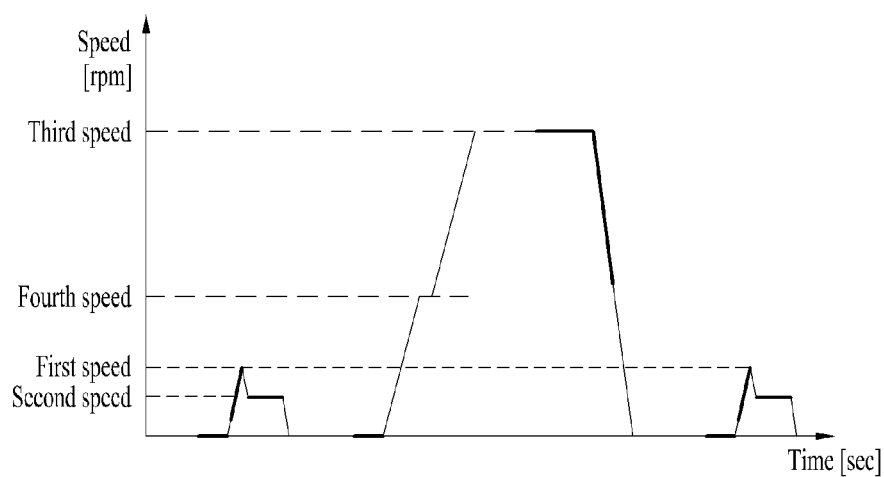

The upper panel 12 may be provided in parallel with the ground or it may be tilted as shown in FIG. 1, with a rear portion tilted higher than a front portion. The volume of the upper area is expanded to secure a predetermined space for installing diverse components such as a water supply unit 21 in the cabinet 1 and provide a user with an easy access to the opening 33 of the tub 3.

A control panel 14 may be provided in a front area of the upper panel 12 and configured to control the operation of the laundry apparatus and a display panel 14b may be provided in the control panel 14. More specifically, the control panel 14 may include a display unit 14b configured to display a current state of the laundry apparatus; and an input unit 14a configured to receive the user's input of an operation command to the laundry apparatus. The display unit 14a may be provided as a liquid crystal and the input unit 14b may be provided as a button or display panel.

The tub 3 mounted in the cabinet 1 may include a tub body 31 for providing a space in which water is stored; and a tub opening 33 provided in an upper surface of the tub body 31 and configured to communicate with the opening 11. The tub 3 may include a tub cover 37 to prevent the backflow or leakage of the water held in the tub 3. The tub cover 37 is provided in the upper surface of the tub body 31 and the tub opening 33 is provided in an inner circumferential surface of the tub cover 37. The tub body 31 may be fixed to the cabinet 1 by a tub support unit 35. The tub support unit 35 may include a spring and a damper so as to dampen the vibration of the tub 3.

The tub body 31 is supplied water via a water supply unit 21 to hold the water. The water supply unit 21 may include a water supply pipe 211 connected with an external water supply source; a water supply valve 212 configured to adjust the flow of the water flowing in the water supply pipe 211 by adjusting the opening of the water supply pipe 211. Although not shown in the drawing, the water supply pipe 211 may be divided into a cold water pipe and a hot water pipe.

The water supply pipe 211 may be extended from the water supply valve 212 to a top of the tub opening 33, while communicating with one side of the tub cover 37 or the tub body 31. In other words, the water supply pipe 211 may be formed in any shapes or structures only when capable of supplying water to the tub 3.

The water held in the tub 3 is drained outside the cabinet 1 via a drainage unit 22. The drainage unit 22 may include a drainage pipe 221 configured to guide the water from the tub 3 outside the cabinet 1; and a drainage pump 222. Although not shown in the drawing, the drainage pipe 221 may be extended a preset distance from the bottom surface of the tub 3 toward the top surface for the tub 3 to hold water. A water level sensing unit 9 may be provided in the tub 3 to measure a water level in the tub 3.

The drum 4 may include a drum body 41 which provides a predetermined space for holding the laundry; and a drum base 42 configured as a bottom surface of the drum 4. A drum opening 43 may be formed in an upper area of the drum body 41 and communicate with the tub opening 33. The drum body 41 and the drum base 42 may be rotatably provided in the tub 3. A plurality of through-holes 411 may be provided in the drum base 42 to lead the water into the drum 4 from the tub 3.

Meanwhile, a passage unit 44 may be provided in an inner circumferential surface of the drum body 41 to move the water held in the lower portion of the drum 5 to an upper portion. In other words, the passage unit 44 may be extended from the drum base 42 to a preset height of the inner circumferential surface of the drum body 41.

The passage unit 44 may include a passage body 411 forming a passage to move water near the drum base 42 to the upper portion of the drum body 41; and an inlet hole 442 to lead the water inside the drum 4 in the passage. At this time, the passage body 441 may be formed as the passage of the water flowing from the lower portion 4 to the upper portion of the drum or the housing with a hole directed toward the drum body 41.

The passage body 441 may be provided in an outer wall of the drum body 41 and extended from the drum base 42 to the inner circumferential surface of the drum body 41. The passage body 441 may be provided in an outer wall of the drum body 41 and one surface of the passage body may define one surface of the drum body 41.

The drum 4 may further include a cut-away portion 423 penetrating the drum base 42 to send the water held in the drum 4 to the passage unit 44. Accordingly, the water held in the drum 4 may flow through the cut-away portion 423 and into the inlet hole 442. In other words, the water held in the drum 4 is exhausted outside the d rum body 41 and re-supplied to the passage unit 44 provided in the drum body 41.

Meanwhile, the passage unit 44 may further include a filter unit 7 configured to filter the water drawn into the passage unit 44 and re-exhaust the filtered water into the drum 4. The filter unit 7 has to re-exhaust the water drawn into the passage unit 44 to the drum 4 such that it may be provided in one surface oriented toward the drum body 41.

The filter unit 7 may form one surface of the passage unit 411 and it may be detachably coupled to the passage unit 44, while made of an independent member. accordingly, the filter unit 9 may be define the inner circumferential surface of the drum body 41. While the water held in the lower portion of the drum 4 is drawn into the passage unit 44 and exhausted to the filter unit 7, foreign substances contained in the water held in the drum 4 can be filtered and removed.

Meanwhile, the drum 4 may include a water current forming unit 6 configured to form the pressure and water current for drawing the water into the passage unit 44 by exhausting the water through the cut-away portion 423. The water current forming unit 6 may be rotatably provided in the drum base 42 and rotatable, independent from the drum 4. The water current forming unit 6 is rotatable in the drum base 42 to exhaust a predetermined amount of the water held in the drum 4 through the cut-away portion 423.

The water current forming unit 6 may include a disk-shaped water current forming body 61 accommodated by the drum base 42; an agitating wing 62 extended from the water current forming body in a radial direction; and a pumping blade 63 projected from a lower end of the water current forming body 61 to push the water held in the drum base 42. In this instance, the lengths of the agitating wing 62 and the pumping blade 63 may be smaller than a diameter of the water current forming body 61, so as to induce the stable rotation of the water current forming unit 6 and minimize the interference with the drum base 42.

The water current forming unit 6 may be functioned to transmit a mechanical force to the clothes loaded in the drum by using the agitating wing 62, or enhance the washing performance by forming water currents in the drum body 41. Moreover, the water current forming unit 6 may be functioned to circulate the water in the drum 4 by drawing the water into the passage unit 44 by using the pumping blade 63.

The water current forming unit 6 may be rotated by the drive unit 9. The drive unit 9 may include a stator 911 fixed to an outer surface of the tub 31 and configured to generate a rotation magnetic force; a rotor 913 rotatable by the rotation magnetic force of the stator 911; and a shaft 914 provided to connect the water current forming unit 6 and the rotor 913, penetrating the bottom surface of the tub body 31.

When the drive unit 9 rotates the water current forming unit 6, the water held in the drum 4 may flow along the rotational direction of the agitating wing 62 and the pumping blade 63. At this time, the water current forming unit 6 is provided in the drum base 42 such that it may be preferred that the drive unit 9 is provided in a lower end of the tub 3.

Meanwhile, the drum 4 may further include a guide unit 5 provided in an outer wall surface of the drum 4 and configured to guide the water exhausted from the drum 4. In other words, the drum 4 and the passage unit 44 may be in communication with each other by the guide unit 5.

Figure 3:
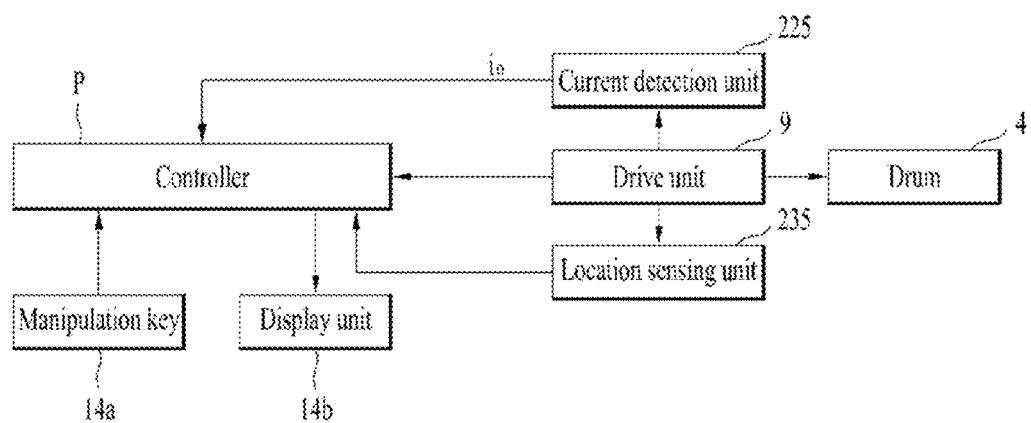
FIG. 3 is a control block diagram of the laundry apparatus.

FIG. 3 is a block diagram illustrating an internal space of the laundry apparatus in accordance with the present disclosure. In the laundry apparatus 100, the drive unit 9 may be controlled by the control operation of the controller (P) such that the drive unit 9 may rotate the drum 4. The controller (P) may receive an operation signal or control command from the input unit 14a and be implemented to perform the control operation. The input unit 14a may include a washing course configured to implement a wash cycle, a rinse cycle and a dry-spin cycle; and an option selection unit. Accordingly, the wash-cycle, the rinse-cycle and the dry-spin cycle may be implemented selectively.

The controller (P) may control the display unit 14b to display the washing course, the washing time, the dry-spinning time, the rinsing time or the current operational state. Meanwhile, the controller (P) controls the drive unit 9 to rotate the drum 4 and the rotation speed of the drum. the controller (P) may control the drive unit 9 based on the current detection unit 225 configured to detect the output current flowing to the drive unit 9 and a location sensing unit 220 configured to sense the location of the drive unit 230.

The detected current of the drive unit 9 and the sensed location signal may be input to the controller 210. Meanwhile, omitting the location sensing unit 235, the laundry apparatus may sense the location of the drive unit 9 by realizing an auxiliary algorithm (in other words, the sensor-less drive unit). The sensor-less drive unit 9 may locate the rotor or stator in the drive unit mentioned above by measuring the current or voltage output from the drive unit 9.

Figure 4:
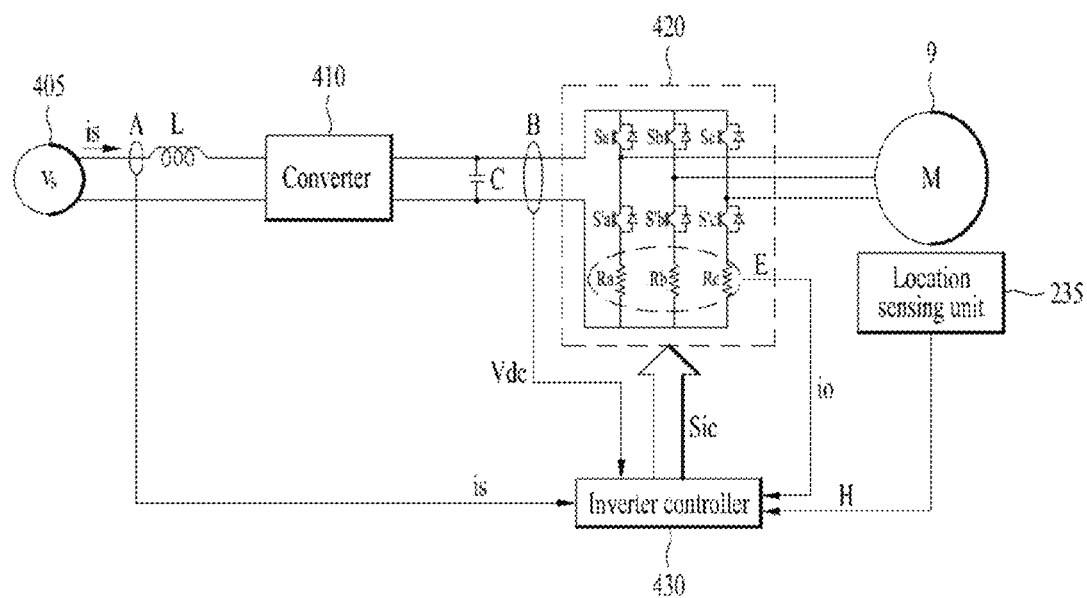
FIG. 4 is a diagram illustrating an operation process of a drive unit provided in the laundry apparatus.

Referring to FIG. 4, the laundry apparatus may further include an inverter 420; and an inverter controller 430 so as to control the above-noted rotor and stator. Also, the drive unit 220 may further include a converter 410 configured to supply the direct-current power input to the inverter 420.

The inverter controller 430 may be provided as an independent element from the controller (P) or the controller (P) may further function as the inverter controller 430 simultaneously. Once the inverter controller 430 outputs a Pulse Width Modulation (PWM) switching control signal (Sic) to the inverter 420, the inverter 420 is configured to a preset frequency alternating current power to the drive unit 9, in other words, the rotor 913 and the stator 911.

The inverter controller 430 may sense the laundry load of the clothes based on the current (io) detected in the current detection unit 220 or the location signal (H) sensed in the location sensing unit 235. As one example, while the drum 120 is rotated, the load of the laundry may be sensed based on the current value (io) of the drive unit 9. The controller (P) may sense the eccentric amount of the drum 4, in other words, the unbalance (UB) of the drum 4. Such the sensing of the eccentric amount may be performed based on ripple elements of the current detected by the current detection unit 220 or the rotation speed variation amount of the drum 4.

The laundry apparatus may include a converter 410; an inverter 420; an inverter controller 430; a DC terminal voltage detection unit (B); a smoothing capacitor (C) and an output current detection unit (E). The laundry apparatus may further include an input current detection unit (A); and a reactor (L). The reactor (L) may be disposed between the commercial AC power source (vs) 405 and the converter 410 and configured to perform the power factor correction or step-up (boost). In addition, the reactor (L) may be configured to limit the harmonics by high speed switching of the converter 410.

The input current detection unit (A) may detect the input current (is) input from the commercial AC power source 405. For that, Current Transformer (CT) or a shunt resistor may be used as the input current detection unit (A). The detected input current (is) is a pulse discrete signal to be input to the inverter controller 430.

The converter 410 may convert the commercial AC power source 504 having passed the reactor (L) into a DC power source and output the DC power source. While it is shown as a single-phase AC power source in the drawing, the commercial AC power source 405 may be a three-phase AC power source. The internal structure of the converter may be variable according to the type of the commercial AC power source 405.

Meanwhile, the converter 410 may be configured of a diode without a switching element and configured to perform rectification without additional switching. For example, a single-phase AC power source uses four diodes as a bridge type. The converter 410 may be a half-bridge converter with two switching and four diodes which are connected with each other. When the converter 410 includes the switching element, the corresponding switching element may perform the voltage step up, the power factor correction and the DC power source conversion.

The smoothing capacitor (C) is exemplified as one element. However, it may be configured of a plurality of elements to secure the element stability. The converter 410 may connect to an output terminal of the converter 410 or a DC power source may be directly input to the converter 410. As one example, a DC power source is input to the smoothing capacitor (C) from a solar cell directly or after the DC/AC conversion. DC power sources are stored in both terminals of the smoothing capacitor (C) and the terminals may be referred to as a DC terminal or DC link terminal.

The DC terminal voltage detection unit (B) may detect DC terminal voltages (Vdc) at the DC terminals of the smoothing capacitor (C). For that, the DC terminal voltage detection unit (B) may include a resistor and an amplifier. The detected dc terminal voltage (Vdc) may be a pulse discrete signal and input to the inverter controller 430.

The inverter 420 may include a plurality of inverter switching elements and configured to convert the smoothed DC power source into the preset frequency three-phase DC power source (va, vb and vc) according to the on/off of the switching elements and output the converted power source to a three-phase synchronous motor 230. In the inverter 420, upper arm switching elements (Sa, Sb and Sc) are paired connected with each other in series are paired with lower arm switching elements (S'a, S'b and S'c), connected with each other in series, such that the total three pairs of the upper and lower arm switching elements may be connected in parallel. A diode may be connected to each of the switching elements (Sa, S'a, Sb, S'b, Sc and S'c) in inverse-parallel. The switching elements disposed in the inverter 420 performs on/off operations based on an inverter switching control signal (Sic) transmitted from the inverter controller 430. Accordingly, the three-phase AC power source having the preset frequency may be output to the three-phase synchronous drive unit 9.

The inverter controller 430 may be configured to control the switching of the inverter 420. For that, the inverter controller 430 may receive the output current (io) detected by the output current detection unit. The inverter controller 430 may output the inverter switching control signal (Sic) to the inverter 420 to control the switching of the inverter 420. The inverter switching control signal (Sic) is generated based on the output current value (io) detected by the output current detection unit (E) and output as a PWM (Pulse Width Modulation) switching control signal.

Figure 5:
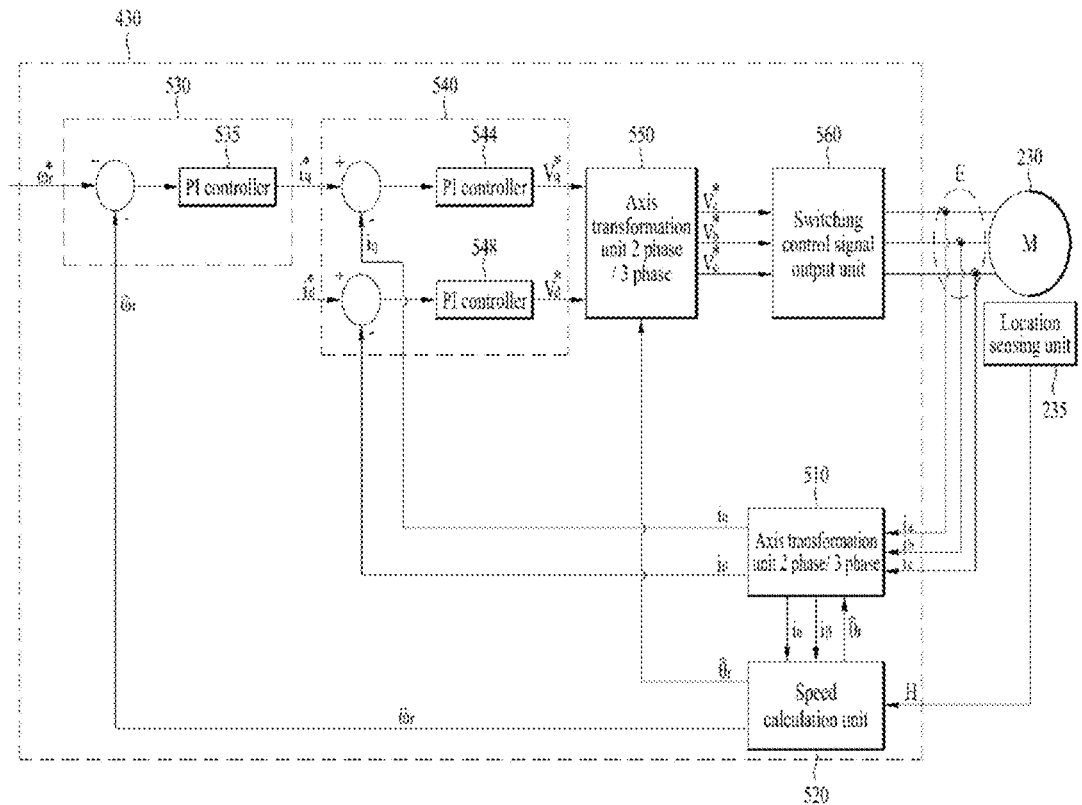
FIG. 5 is a diagram illustrating an operation principle of the drive unit provided in the laundry apparatus.

FIG. 5 specifically illustrates the structure configured to control the drive unit 9 by using the inverter controller 430. The output current detection unit (E) may detect the output current (io) flowing between the inverter 420 and the three-phase drive unit 9. In other words, the current flowing to the drive unit 9 may be detected. The output current detection unit (E) may detect all of the three-phase output currents (ia, ib and ic).

Alternatively, the two phase output currents may be detected by using 3-phase equilibrium. The output current detection unit (E) may be disposed between the inverter 420 and the drive unit 9 and Current Transformer (CT) or shunt resistor may be used as the output current detection unit (E) so as to detect the current. When the shunt resistor is used, three shunt resistors may be disposed between the inverter 420 and the drive unit 9 or one terminal of each shut resistor may connect to the three lower arm switching elements (S'a, S'b and S'c) of the inverter 420. Meanwhile, it is possible to use two shut resistors by using 3-phase equilibrium. When one shut resistor is used, the corresponding resistor may be disposed between the above-noted capacitor (C) and the inverter 420.

The detected output current (io) is the pulse discrete signal and applied to the inverter controller 430. The inverter switching control signal (Sic) is generated based on the detected output current (io). Hereinafter, the detected output current (io) is the 3-phase output current (ia, ib and ic).

Meanwhile, the 3-phase drive unit 9 includes a stator and a rotor. When the preset frequency 3-phase AC power sources are applied to corresponding-phase coils wound around the stator to rotate the rotor. Examples of such the drive unit 9 may include Surface-Mounted Permanent-Magnet Synchronous Motor (SMPMSM), Interior Permanent Magnet Synchronous Motor (IPMSM) and Synchronous Reluctance Motor (SynRM). SMPMSM and IPMSM are Permanent Magnet Synchronous Motors (PMSMs) and SynRM has no permanent magnet.

Meanwhile, when the converter 410 includes a switching element, the inverter controller 430 may control the switching of the switching element provided in the converter 410. For that, the inverter controller 430 may receive the input current (is) detected by the input current detection unit (A). The inverter controller 430 may output a converter switching control signal (Scc) to the converter 410 to control the switching operation of the converter 410. Such the converter switching control signal (Scc) may be a Pulse Width Modulation (PWM) switching control signal and generated based on the input current (is) detected by the input current detection unit (A) to be output.

Meanwhile, the location sensing unit 235 may be configured to sense the location of the rotor in the drive unit 9. For that, the location sensing unit 235 may include a hall sensor. The sensed location (H) of the rotor may be input to the inverter controller 430 and used in calculating the speed.

The inverter controller 430 may include an axis transformation unit 510; a speed calculation unit 520; a current order generation unit 530; a voltage order generation unit 540; an axis transformation unit 550; and a switching control signal output unit 560. The axis transformation unit 510 may be configured to receive and convert the 3-phase output currents (ia, ib and ic) detected by the output current detection unit (E) into 2-phase currents (i$\alpha$, I$\beta$) of a stationary reference frame. The axis transformation unit 510 may convert the 2-phase currents (i$\alpha$, I$\beta$) of the stationary reference frame into 2-phase currents (id and iq) of a rotor reference frame.

The speed calculation unit 520 may calculate the speed based on a location signal (H) of the rotor input from the location sensing unit 235. In other words, the location signal is divided by the current time to calculate the speed. The speed calculation unit 520 may output the calculated location and the calculated speed based on the input location signal (H) of the rotor.

The current order generation unit 530 may generate a current order value (i*q) based on the calculated speed (Wr) and the speed order value (w*r). For example, the current order generation unit 530 may perform the PI control of a PI controller 535 and generate a current order value (iq), based on a difference between the calculated speed (Wr, and the speed order value (w*r). In the drawing, a q-axis current order value (i*q) is exemplified as the current order. Different from what is shown in the drawing, a d-axis current order (i*d) may be generated together. Meanwhile, the d-axis current order value (i*d) may be set as zero.

Meanwhile, the current order generation unit 530 may further include a limiter (not shown) configured to limit the level of the current order value from becoming over an allowable range. hence, the voltage order generation unit 540 may generate a d-axis voltage order value and a q-axis voltage value (v*d and v*q) based on the d-axis current and q-axis current (id and iq) axis-transformed into the 2-phase rotor reference frame by the axis transformation unit and the current order values (i*d and i*q) in the current order generation unit 530. For example, the PI controller 544 may perform the PI control based on a difference between the q-axis current (iq) and the q-axis current order value (i*q) and the voltage order generation unit 540 may generate a q-axis voltage order value (v*q). The PI controller 548 may perform PI control based on a difference between the d-axis current (id) and the d-axis current order value (i*d) and the voltage order generation unit 540 may generate a d-axis voltage order value (v*d). Meanwhile, the d-axis voltage order value (v*d) may be set as zero, corresponding to the d-axis current order value (i*d) set as zero.

The voltage order generation unit 540 may further include a limiter (not shown) configured to limit the level of the d-axis voltage value and the q-axis voltage value (v*d and v*q) from becoming over an allowable range. The generated d-axis and q-axis voltage order values (v*d and v*q) may be input to the axis transformation unit 550.

The axis transformation unit 550 may receive the location, d-axis and q-axis voltage values which are calculated by the speed calculation unit 520 and perform the axis transformation. First of all, the axis transformation unit 550 may transform the 2-phase rotor reference frame into the 2-phase stationary reference frame. At this time, the location calculated (theta) in the speed calculation unit 520 may be used.

Hence, the axis transformation unit 550 may transform the 2-phase stationary reference frame into the 3-phase stationary reference frame. Through the transformation, the axis transformation unit 550 may output 3-phase output voltage order values (v*a, v*b and v*c).

The switching control signal output unit 560 may generate and output a switching control signal (Sic) for the inverter according to PWM based on the 3 phase output voltage order values (v*a, v*b and v*c). The output inverter switching control signal (Sic) is converted into a gate drive signal in a gate drive unit (not shown) and the gate drive signal may be input to a gate of each switching element disposed in the inverter 420. Accordingly, each of the switching elements (Sa, S'a, Sb, S'b, Sc and S'c) may perform the switching.

Meanwhile, the switching control signal output unit 560 may combine the 2 phase PWM and the 3 phase PWM, only to generate and output an inverter switching control signal (Sic). For example, in an accelerating rotation section, the inverter switching control signal (Sic) according to the 3 phase PWM may be generated and output. In a constant velocity rotation section, the inverter switching control signal (Sic) according to the 2 phase PWM may be generated and output to detect a counter electro-motive force.

Figure 6:
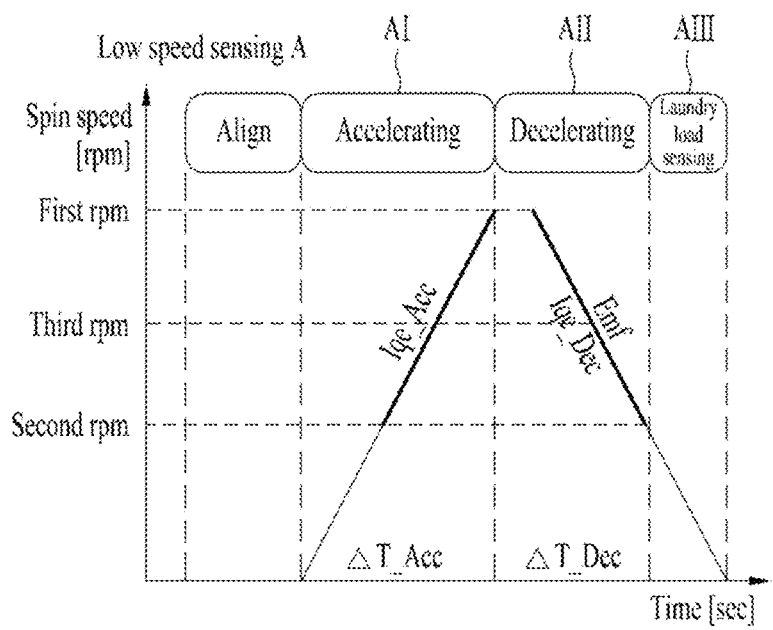
FIG. 6 is a diagram illustrating a laundry load sensing method of the laundry apparatus.

Hereinafter, a method of sensing the laundry load will be described, referring to FIG. 6. The controller (P) may sense the load of the laundry held in the drum 4 before the wash cycle, the rinse cycle and the dry-spin cycle. For that, the controller (P) may include an accelerating step (I) for accelerating the drum 4; a decelerating step (II) for decelerating the drum 4; a laundry load sensing step (III) for sensing the load of the laundry held in the drum based on a measured acceleration value of the drive unit 9 during the accelerating step and the measured deceleration value of the drive unit 9 during the decelerating step.

More specifically, the laundry apparatus may sense the measured acceleration value measured by or applied to the drive unit 9 while accelerating the drive unit 9 or sense the measured deceleration value measured by or applied to the drive unit 9. After that, the measured acceleration value and the measured deceleration value may be the order values applied to the drive unit 9, while the drive unit 9 is driving or the values measured by the drive unit 9, while the drive unit 9 is driving.

The order value may be a current order value or voltage order value which is applied to the drive unit 9 while the drive unit 9 is driving or a measured value measured by the drive unit 9 while the drive unit 9 is driving. For example, the order value may be the current order value or voltage order value derived by the PI controller 535 to drive the drive unit 9. The measured value may be a current or voltage value of the drive unit 9 which is measured by the location sensing unit 235 or the current sensing unit 225.

Accordingly, the laundry apparatus may include no step for driving the drive unit 9 at a constant velocity so as to reduce the time taken to sense the load of the laundry. Also, the energy needed to maintain the drive unit at the constant velocity may be saved and the friction force of the drive unit 9 which has to be overcome when maintaining the drive unit 9 at the constant velocity may be ignored.

When the controller (P) uses the order value in sensing the load of the laundry, it is not necessary to feed back a current situation to the drive unit 9 or consider the current driving situation of the drive unit 9 such that it may become simple and easy to calculate the load of the laundry.

The measured acceleration value may include an acceleration current value (Iq*_ACC) measured by the drive unit. The measured deceleration value may include a deceleration current value (Iq_DEC). More specifically, the acceleration current value may include a current order value (Iq*_ACC) for rotating the drive unit during the accelerating step. The deceleration current value may include a current order value (Iq*_DEC) for rotating the drive unit during the decelerating step.

Meanwhile, when the controller (P) uses the measured values in sensing the load of the laundry, the controller (P) reflects the actual current situation in the drive unit 9 and it is able to gain the precise load of the laundry advantageously. The order value is generated only when the drive unit 9 is actively controlled after driven or applied the power to. When using the measured value, the data for sensing the load of the laundry can be gained advantageously even if the power is shut off or the drive unit is not controlled actively.

The laundry apparatus may decelerate the drive unit 9 according to a dynamic braking method by shutting the power off in the decelerating step (II). Accordingly, the algorithm for controlling the decelerating step (II) may be omitted and the energy consumed during the decelerating step (II) may be saved. Moreover, as the power is shut off in the decelerating step (II), the voltage order value may be zero such that the load of the laundry may be sensed by calculating only the current except the voltage.

More specifically, a control method of the laundry apparatus may ignore the voltage value or use no voltage value, while using only the current value, such that the control method may include a very simple calculation formula for sensing the load of the laundry. As the calculation formula becomes simple, the calculation may be performed fast and precisely and the precise load of the laundry may be then sensed.

That is, the data and algorithm (hereinafter, the calculation formula) for calculating the measured acceleration value and the measured deceleration value may be stored in the controller (P). The calculation formula may be provided not to use the voltage value at the beginning such that the counter electro-motive force may not be calculated only to omit the constant velocity rotating step of the drive unit 9.

The calculation formula is as follows and the laundry load (inertia, Jm, Load_data) may be calculated by the following formula:

$$= \frac{3}{2}\frac{P}{2}K_e \frac{i_q^{ACC} - i_q^{DEC}}{\Delta\omega_m^{Acc}/\Delta t_{Acc} - \Delta\omega_m^{Dec}/\Delta t_{Dec}}$$

'P' and "Ke" may be constant values and measured by the controller (P). The denominator is corresponding to a difference between the speed variation amount in the accelerating step and the speed variation amount in the decelerating step.

The speed variation amount may be measured by the location sensing unit 235 under the control of the controller (P) or calculated based on the measured time taken, until the drum is accelerated or decelerated, or directly sensed by measuring the current.

Accordingly, the laundry load (or load) may be calculated immediately only by measuring an acceleration output current value (Iq_ACC) during the accelerating step and a deceleration output current value (Iq_DEC) during the decelerating step. In other words, the acceleration current value may include the acceleration output current value (Iq_ACC) output from the drive unit during the accelerating step. The deceleration current value may include the deceleration output current value (Iq_DEC) output from the drive unit during the decelerating step.

Moreover, an average of the current values measured by the drive unit during the accelerating step may be applied to the acceleration output current value. An average (Iqe_DEC) of the current values measured by the drive unit during the decelerating step may be applied to the deceleration output current value.

In any cases, the laundry load may be calculated by using only one factor of the current value, while the factor of the voltage value may be omitted. Accordingly, the time taken to sense the laundry load may be reduced more. Accordingly, even if the accelerating step or the decelerating step is very short, the laundry load is able to be sensed precisely and the overall time taken to sense the laundry load is then able to be sensed.

Meanwhile, the laundry load sensing of the laundry apparatus may be performed by accelerating and decelerating right after that. Accordingly, the time taken to measure the laundry load may be very short and the clothes held in the drum 4 cannot move or flow for the time period such that the laundry load can be sensed in a short time without changing the state of the clothes and that the accuracy of the laundry load calculation may be improved more.

Meanwhile, the calculation formula applied to the laundry load sensing may use a difference between the current values in the accelerating step and the current value in the decelerating step. Accordingly, the friction force of the drive unit during the accelerating step is equal to the friction force of the drive unit in the decelerating step such that the compensation formulas of the currents considering the friction forces may be offset. The method of controlling the laundry load need not consider the friction force of the drive unit 9, only to omit the process of correcting or tuning the friction force. The laundry load sensing method may not use the voltage value and then omit the process of compensating or tuning the error of the voltage values and the process of maintaining the constant velocity so as to omit the process of compensating or tuning the friction force of the drive unit 9. Accordingly, the method of controlling the laundry load sensing can derive the laundry load right after the current value is substituted and it can also sense the laundry load fast and precisely because it includes no process of compensating or tuning the laundry load. Accordingly, the loads applied to the controller (P) may be lowered and the structure of the controller (P) may be replaced with a simple structure or the function of the controller (P) may be used in other ways.

As known from the calculation formula, the measured acceleration value may further include a spin speed variation in the accelerating step. The measured deceleration value may further include a spin speed variation in the decelerating step.

The spin speed variation of the accelerating step and the spin speed variation of the decelerating step are required so as to calculate a difference between the inertia of the accelerating step and that of the decelerating step. It is not necessary to measure an additional voltage value and provide the compensating or tuning process.

More specifically, the above-noted description may be derived from a following calculation formula:

$$\text{Acceleration Inertia} = \frac{T_\theta^{ACC}}{D_m^{Acc} - D_m^{Dec}}$$

$$\text{Deceleration Inertia} = \frac{T_\theta^{Dec}}{D_m^{Acc} - D_m^{Dec}}$$

$$\text{Where } D_m = \frac{dw_m}{dt} = \frac{\Delta w_m}{\Delta t}$$

At this time, the laundry load may be calculated based on a difference between the acceleration inertia and the deceleration inertia such that the spin speed variation may be needed. Accordingly, when the measured acceleration value and the measured deceleration value are measured at the same RPM section of the drum, the width of the spin speed variation is the same and the calculation becomes then simplified. In other words, it is preferred that the accelerating step (I) and the decelerating step (II) share the same speed range.

Meanwhile, the laundry load sensing method of the laundry apparatus may sense the laundry load based on the current order value measured in the accelerating step (I) and the decelerating step (II) and the current value measured in the drive unit 9. In this instance, as the calculation formula uses the current value, the decelerating step (II) and the accelerating step (I) may be performed to measure the current value and the laundry load may be sensed based on the measured current value.

However, if the accelerating step (I) is performed during the decelerating step (II), a drastic current is supplied to accelerate the drive unit 9 and a current peak is likely to occur. If the current peak occurs, a temporary too much load might be applied to the controller (P) and damage might be generated in the circuit having the controller (P) and the drive unit 9. To prevent the damage to the controller (P) and the circuit, other materials have to be used or an auxiliary structure has to be provided to enhance the durability of the controller (P) or circuit disadvantageously. Moreover, while the drum 4 is accelerated after decelerated, the clothes are likely to move in the drum and it might be impossible to measure the precise load of the clothes.

Accordingly, it is preferred that the laundry load is measured once the decelerating step (II) is performed after the decelerating step (I). More specifically, the accelerating step (I) may accelerate the drum to a first rpm and the decelerating step (II) may decelerate the drum from the first rpm. In other words, the accelerating step (I) and the decelerating step (II) may be performed serially. The decelerating step (II) can be performed once the current order value to the drive unit 9 is lowered or the voltage applied to the drive unit 9 is shut off. Accordingly, there is no concern of damage to the controller (P) or circuit.

At this time, the measured accelerating value and the measured deceleration value may be measured at the first rpm and between a lower rpm than the first rpm and the second rpm. In other words, a current value in a section having a vertex in the speed graph and the laundry load is able to be sensed based on the measured current value. That means that the current values are measured in the serial situations and the laundry load is sensed based on the measured current values. Accordingly, the situations in which the error might occur may be minimized advantageously.

Meanwhile, the measured acceleration value and the measured between a second rpm lower than the first rpm and a third rpm higher than the second rpm and lower than the first rpm. In other words, the current value is measured in same speed section, not the section having the vertex, and then the laundry load is able to be sensed by using the measured value. As the spin speed variation is the largest at the vertex, the stabilized current value is measured and there may be an advantage of the improved accuracy in calculating the laundry load accordingly.

The first rpm may be lower than an rpm at which the clothes held in the drum 4 are fixedly in contact with an inner wall of the drum 4. In other words, the first rpm may relatively be lower than the rpm which is used in the wash, rinse or dry-spin cycle. Accordingly, the laundry apparatus may measure the laundry load even unless the drum 4 is rotated at a fast speed.

Figure 7:
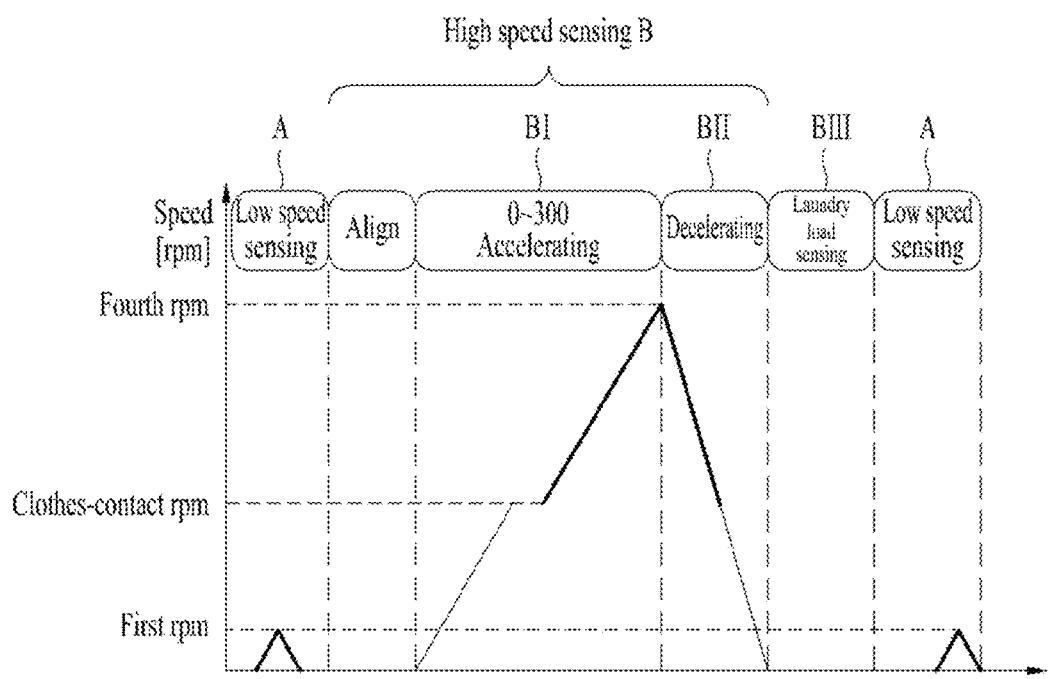
FIG. 7 is a diagram illustrating one embodiment of the laundry load sensing method.

Referring to FIG. 7, the laundry apparatus may accelerate the drum to a fourth rpm which is higher than the rpm at which the clothes are fixedly in close contact with the inner wall of the drum 4 (hereinafter, the clothes-contact rpm) and then decelerate the drum, only to sense the laundry load. The laundry apparatus may combine the laundry load sensing after the drum is accelerated to the first rpm and then decelerated with the laundry load sensing after the drum is accelerated to the fourth rpm and then decelerated.

More specifically, the accelerating step (I) may include a low speed accelerating step (AI) for accelerating the drum to a first rpm which is lower than the rpm at which the clothes start to be fixedly in contact with the inner wall of the drum; and a high speed accelerating step (BI) for accelerating the drum to a fourth rpm which is higher than the rpm at which the clothes are moved to start the close contact with the inner wall of the drum.

The decelerating step (II) may include a low speed decelerating step (AII) for decelerating the drum 4 from the first rpm; and a high speed decelerating step (BII) for decelerating the drum from the fourth rpm. At this time, it is preferred that the current is measured between the fourth rpm and the rpm at which the clothes are in contact with the inner wall in the high speed accelerating step (BI) and the high speed decelerating step (BII), because there is some concern that the clothes are moved enough to generate an error in a speed section lower than the clothes-contact rpm.

The laundry load sensing step (III) may include a low speed laundry load sensing step (AIII) for sensing the laundry load based on the measured accelerating value of the drive unit during the low speed accelerating step and the measured deceleration value of the drive unit during the low decelerating step; and a high speed laundry load sensing step (BIII) for sensing the laundry load based on the measured acceleration value of the drive unit during the high speed accelerating step and the measured deceleration value of the drive unit during the high speed decelerating step.

In other words, the laundry load sensing method of the laundry apparatus may include a low speed sensing step (A) for sensing the laundry load by performing the low speed accelerating step (I), the low speed decelerating step (II) and the low speed laundry load sensing step (AIII); and a high speed sensing step (B) for sensing the laundry load by performing the high speed accelerating step (BI), the high speed decelerating step (BII) and the high speed laundry loading step (BIII).

The controller (P) may measure the laundry load precisely by performing the low speed sensing step (A) and the high speed sensing step (B) properly. In any cases, the laundry load may be sensed by using the current values measured in the drive unit 9.

Referring to FIG. 7, the laundry apparatus may perform the high speed sensing step (B) after the low speed sensing step (A). In other words, the low speed sensing step (A) and the high speed sensing step (B) are performed and the laundry loads are measured in the two steps, respectively, to calculate an average of the two loads. The laundry loads are compared with the measured average and the current state of the drive unit 9 for presence of an error is checked based on the result of the comparison. In the high speed sensing step (B), the clothes are fixedly in close to the inner wall of the drum and it is possible to measure the precise laundry load such that a weighting is given on the laundry load measured in the high speed sensing step (B).

Figure 8:
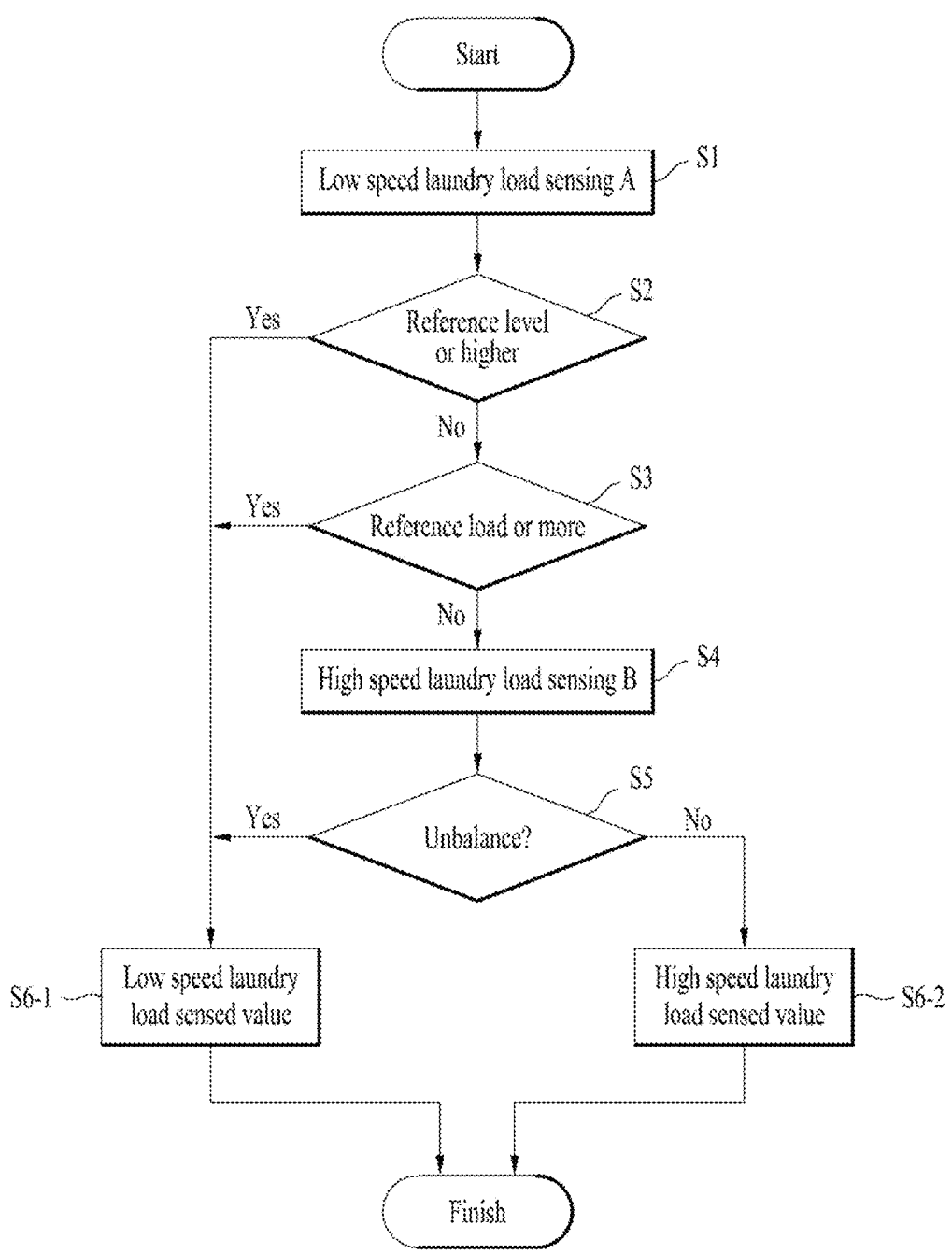
FIG. 8 is a flow chart illustrating the laundry load sensing method.

Hereinafter, referring to FIG. 8, embodiments of the low speed sensing step (A) and the high speed sensing step (B) will be described. Once the washing course or options are implemented or a command for sensing the laundry load is input by the user, the controller (P) may perform a step (S1) for sensing the laundry load by performing the low speed laundry sensing step (A); a water level measuring step (S2) for measuring whether a water level in the tub 3 is a reference level or higher; and a laundry load excess determining step (S3) for measuring whether the laundry load measured in the low speed laundry load sensing step (A) is a reference load or more.

The laundry apparatus may determine whether to perform the high speed laundry load sensing step (B) based on the water level the sensed laundry load. The reference level may be the water level at which the clothes held in the drum 4 are wet or humid or the moisture contained in the clothes is saturated. In other words, the clothes are submerged in the water of the tub at the reference level.

Meanwhile, the reference load may be the load of the laundry which is not attached to the inner wall of the drum 4 in the drum 4 uniformly. In other words, the reference load means that many clothes are held in the drum and all of the clothes are in contact with the inner wall of the drum 4.

When the water level is the reference level or higher, the high speed laundry load sensing step (B) is performed and too much load is then likely to occur in the drive unit 9. When the laundry load is the reference load or more, there may be no variation in the laundry loads even at the high speed spin of the drum.

Accordingly, when the water level in the tub is the reference level or higher or the laundry load sensed in the low speed laundry load sensing step (A) is the reference load or more, a low speed laundry load value confirming step (S6-1) for confirming the laundry load sensed in the low speed laundry load sensing step (A) as the final laundry load may be performed.

In other words, when the water level measured in the water level measuring step (S2) is the reference level or higher, the high speed laundry load sensing step (B) may be omitted. When the laundry load measured in the laundry load access determining step (S3) is the reference load or more, the high speed laundry load sensing step (B) may be omitted. The water level measuring step (S2) may be performed earlier than the low speed laundry load sensing step (S1).

Meanwhile, when the water level in the tub 3 is lower than the reference level while the laundry load is smaller than the reference load, the high speed laundry load sensing step (B) is performed and the laundry load is sensed (S4). After that, once the high speed laundry load sensing step (B) ends, the high speed laundry load sensed value conforming step (S6-2) may be performed to confirm the laundry load sensed in the high speed laundry load sensing step (B) as the final load.

In other words, the laundry load sensing method only confirms the sensed high speed laundry load value as the final load and need not calculate the low speed laundry load sensed value and the average. As mentioned above, there is no need of the error compensation and the calculation tuning such that the sensed laundry load value can be precise and that the high speed laundry load value is sensed with no moving clothes, only to confirm the sensed high speed laundry load value as the final load.

Meanwhile, the laundry load sensing method may further include an unbalance sensing step (S5) for sensing whether unbalance occurs in the tub or drum during the high speed laundry load sensing step (B). When the balance is sensed in the unbalance sensing step (S5), a low speed laundry load sensed value confirming step (S6-1) for confirming the laundry load sensed in the low speed laundry load sensing step (A) as the final load may be performed.

When the unbalance is generated, the current values output from the drive unit 9 become inconsistent and the current values become unreliable. Hence, the laundry load sensed in the low speed laundry sensing step (A) may be confirmed as the final load. Accordingly, the laundry apparatus will not perform the high speed laundry load sensing step (B) unquestioningly and it can sense the precise laundry load fast and efficiently.

The foregoing embodiments are merely exemplary and are not to be considered as limiting the present disclosure. The present teachings can be readily applied to other types of methods and apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments. As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds, are therefore intended to be embraced by the appended claims.

Technical Problem

To overcome the disadvantages, an object of the present disclosure is to provide a laundry load sensing method which may sense the precise laundry load, while omitting the process of compensating the error to measure the laundry load. Another object of the present disclosure is to provide a laundry load sensing method which may reduce the laundry load sensing time when the laundry load is measured. A further object of the present disclosure is to provide a laundry load sensing method which may omit the process of maintaining the drive unit at the constant velocity unnecessarily when measuring the load of the laundry. A still further object of the present disclosure is to provide a laundry load sensing method which may calculate the laundry load by using only a current value of the drive unit when measuring the laundry load.

A still further object of the present disclosure is to provide a laundry load sensing method which may enhance the accuracy and reliability of the laundry load by completing the laundry load measurement while accelerating and decelerating the drive unit and minimizing the variation of the laundry state. A still further object of the present disclosure is to provide a laundry load sensing method which may prevent momentary current peak and damage to a controller. A still further object of the present disclosure is to provide a laundry load sensing method which may measure the load of dried laundry, wet laundry and laundry before dry-spinning according to the same method.

Technical Solution

To achieve these objects and other advantages and in accordance with the purpose of the embodiments, as embodied and broadly described herein, a control method of a laundry apparatus comprising: a drum provided to hold clothes; and a drive unit configured to rotate the drum, the control method comprising: an accelerating step for accelerating the drum; a decelerating step for decelerating the drum; and a laundry load sensing step for sensing the laundry load of the clothes held in the drum based on a measured acceleration value of the drive unit during the accelerating step and a measured deceleration value of the drive unit during the decelerating step.

The measured acceleration value may comprise an acceleration current value measured in the drive unit, and the measured deceleration value comprises a deceleration current value measured in the drive unit. The acceleration current value may comprise a current order value configured to rotate the drive unit during the accelerating step, and the deceleration current value comprises a current order value configured to rotate the drive unit during the decelerating step.

The acceleration current value may comprise an acceleration output current value output from the drive unit during the accelerating step, and the deceleration current value may comprise an acceleration output current value output from the drive unit during the decelerating step. The acceleration output current value may comprise an average of the current values output from the drive unit during the accelerating step, and the deceleration output current value may comprise an average of the current values output from the drive unit during the decelerating step.

The measured acceleration value may further comprise a spin speed variation during the accelerating step, and the measured deceleration value further comprises a spin speed variation during the decelerating step. The decelerating step may shut off the electric power applied to the drive unit.

The measured acceleration value and the measured deceleration value may be measured in the same rpm sections of the drum. The accelerating step may comprise a first accelerating step for accelerating the drum to a first rpm, and the decelerating step comprises a first decelerating step for decelerating the drum from the first rpm.

In the control method of the laundry apparatus, the measured acceleration value and the measured deceleration value are measured between the first rpm and a second rpm which is lower than the first rpm. The measured acceleration value and the measured deceleration value may be measured between the second rpm lower than the first rpm and a third rpm which is higher than the second rpm and lower than the first rpm.

The accelerating step may comprise a low speed accelerating step for accelerating the drum to a first rpm which is lower than a preset rpm (a clothes-contact rpm) at which the clothes start to be in close contact with an inner wall of the drum; and a high speed accelerating step for accelerating the drum to a fourth rpm which is higher than the clothes-contact rpm. The decelerating step may comprise a low speed decelerating step for decelerating the drum from the first rpm; a high speed decelerating step for decelerating the drum from the fourth rpm.

The laundry load sensing step may comprise a low speed laundry load sensing step for sensing the laundry load based on the measured acceleration value of the drive unit during the low speed accelerating step and the measured deceleration value of the drive unit during the low speed decelerating step; and a high speed laundry load sensing step for sensing the laundry load based on the measured acceleration value of the drive unit during the high speed accelerating step and the measured deceleration value of the drive unit during the high speed decelerating step.

To solve the above-noted problems, the laundry apparatus further comprises a tub provided to rotatably accommodate the drum and hold water; and a water level measuring unit configured to measure a water level in the tub. The control method further comprises a step for sensing the laundry load by performing the low speed laundry load sensing step; a water level measuring step for measuring whether the water level in the tub is a reference level or higher; and a laundry load excess determining step for measuring whether the laundry load measured in the low speed laundry load sensing step is a reference load or more, wherein it is determined whether to perform the high speed laundry load sensing step based on the water level and the sensed laundry load.

The control method of the laundry apparatus may further comprise a low speed laundry load sensed value confirming step for confirming the laundry load sensed in the low speed laundry load sensing step as the final laundry load, when the water level in the tub is the reference level or higher and the laundry load sensed in the low speed laundry load sensing step is the reference load or more.

The control method of the laundry apparatus may further comprise a high speed laundry load sensed value confirming step for confirming the laundry load sensed in the high speed laundry load sensing step as the final laundry load by performing the high speed laundry load sensing step, when the water level in the tub is lower than the reference level and the laundry load is smaller than the reference load.

The control method of the laundry apparatus may further comprise an unbalance sensing step for sensing presence of unbalance in the tub or drum in the high speed laundry load sensing step, wherein the low speed laundry load sensed value confirming step for confirming the laundry load sensed in the low speed laundry load sensing step as the final load is performed when the unbalance is sensed in the unbalance sensing step.

Advantageous Effects

The embodiments have following advantageous effects. According to the embodiments of the present disclosure, the laundry load sensing method is capable of sensing the precise laundry load, while omitting the process of compensating the error to measure the laundry load. Furthermore, the laundry load sensing method is capable of reducing the laundry load sensing time when the laundry load is measured.

Still further, the laundry load sensing method is capable of omitting the process of maintaining the drive unit at the constant velocity unnecessarily when measuring the load of the laundry. Still further, the laundry load sensing method is capable of calculating the laundry load by using only a current value of the drive unit when measuring the laundry load.

Still further, the laundry load sensing method may enhance the accuracy and reliability of the laundry load by completing the laundry load measurement while accelerating and decelerating the drive unit and minimizing the variation of the laundry state. Still further, the laundry load sensing method may prevent momentary current peak and damage to a controller.

Still further, the laundry load sensing method may measure the load of dried laundry, wet laundry and laundry before dry-spinning according to the same method. Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

INDUSTRIAL APPLICABILITY

Industrial applicability of the present invention is included in the description of the specific embodiments.

The invention claimed is:

1. A control method of a laundry apparatus comprising: a cabinet having an opening at a top surface of thereon, a tub provided in the cabinet and having an inlet communicating with the opening, a drum provided in the tub to hold clothes, and a drive unit provided at the tub and disposed below the drum to rotate the drum, the control method comprising:
an accelerating step for accelerating the drum;
a decelerating step for decelerating the drum; and
a laundry load sensing step for sensing the laundry load of the clothes held in the drum based on a measured acceleration value of the drive unit during the accelerating step and a measured deceleration value of the drive unit during the decelerating step,
wherein the drum rotates more than one revolution during the accelerating step and the decelerating step,
wherein the accelerating step comprises:
a low speed accelerating step for accelerating the drum to a first rpm which is lower than a preset clothes-contact rpm at which the clothes start to be in close contact with an inner wall of the drum; and
a high speed accelerating step for accelerating the drum to a fourth rpm which is higher than the clothes-contact rpm,
wherein the decelerating step comprises:
a low speed decelerating step for decelerating the drum from the first rpm; and
a high speed decelerating step for decelerating the drum from the fourth rpm, and
the laundry load sensing step comprises:
a low speed laundry load sensing step for sensing the laundry load based on the measured acceleration value of the drive unit during the low speed accelerating step and the measured deceleration value of the drive unit during the low speed decelerating step; and
a high speed laundry load sensing step for sensing the laundry load based on the measured acceleration value of the drive unit during the high speed accelerating step and the measured deceleration value of the drive unit during the high speed decelerating step.

2. The control method of the laundry apparatus of claim 1, wherein the measured acceleration value comprises an acceleration current value measured in the drive unit, and the measured deceleration value comprises a deceleration current value measured in the drive unit.

3. The control method of the laundry apparatus of claim 2, wherein the acceleration current value comprises a current order value configured to rotate the drive unit during the accelerating step, and
the deceleration current value comprises a current order value configured to rotate the drive unit during the decelerating step.

4. The control method of the laundry apparatus of claim 2, wherein the acceleration current value comprises an acceleration output current value output from the drive unit during the accelerating step, and
the deceleration current value comprises a deceleration output current value output from the drive unit during the decelerating step.

5. The control method of the laundry apparatus of claim 4, wherein the acceleration output current value comprises an average of the current values output from the drive unit during the accelerating step, and the deceleration output current value comprises an average of the current values output from the drive unit during the decelerating step.

6. The control method of the laundry apparatus of claim 2, wherein the measured acceleration value further comprises a spin speed variation during the accelerating step, and
the measured deceleration value further comprises a spin speed variation during the decelerating step.

7. The control method of the laundry apparatus of claim 1, wherein the decelerating step shuts off the electric power applied to the drive unit.

8. The control method of the laundry apparatus of claim 1, wherein the measured acceleration value and the measured deceleration value are measured in the same rpm sections of the drum.

9. The control method of the laundry apparatus of claim 8, wherein the accelerating step accelerates the drum to a first rpm, and the decelerating step decelerates the drum from the first rpm.

10. The control method of the laundry apparatus of claim 9, wherein the measured acceleration value and the measured deceleration value are measured between the first rpm and a second rpm which is lower than the first rpm.

11. The control method of the laundry apparatus of claim 10, wherein the measured acceleration value and the measured deceleration value are measured between the second rpm lower than the first rpm and a third rpm which is higher than the second rpm and lower than the first rpm.

12. The control method of the laundry apparatus of claim 1, the laundry apparatus further comprising:
a water level measuring unit configured to measure a water level in the tub, the control method further comprising:
a step for sensing the laundry load by performing the low speed laundry load sensing step;
a water level measuring step for measuring whether the water level in the tub is a reference level or higher; and
a laundry load excess determining step for measuring whether the laundry load measured in the low speed laundry load sensing step is a reference load or more,
wherein it is determined whether to perform the high speed laundry load sensing step based on the water level and the sensed laundry load.

13. The control method of the laundry apparatus of claim 12, further comprising:
a low speed laundry load sensed value confirming step for confirming the laundry load sensed in the low speed laundry load sensing step as the final laundry load, when the water level in the tub is the reference level or higher and the laundry load sensed in the low speed laundry load sensing step is the reference load or more.

14. The control method of the laundry apparatus of claim 12, further comprising:
a high speed laundry load sensed value confirming step for confirming the laundry load sensed in the high speed laundry load sensing step as the final laundry load by performing the high speed laundry load sensing step, when the water level in the tub is lower than the reference level and the laundry load is smaller than the reference load.

15. The control method of the laundry apparatus of claim 14, further comprising:
an unbalance sensing step for sensing presence of unbalance in the tub or drum in the high speed laundry load sensing step,
wherein the low speed laundry load sensed value confirming step for confirming the laundry load sensed in the low speed laundry load sensing step as the final load is performed when the unbalance is sensed in the unbalance sensing step.

* * * * *